No. 661,709. Patented Nov. 13, 1900.
N. WESTON.
SPRING GEAR FOR BUGGIES.
(Application filed Sept. 15, 1900.)

(No Model.) 2 Sheets—Sheet 1.

Witnesses

Inventor,
Nathaniel Weston,
By Davis & Davis
Attorneys

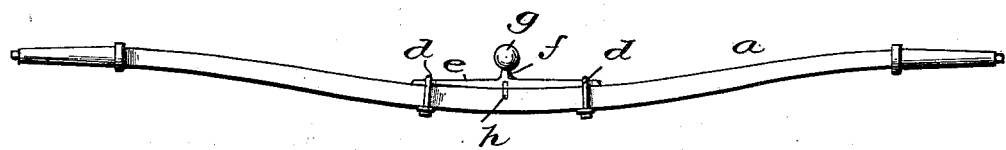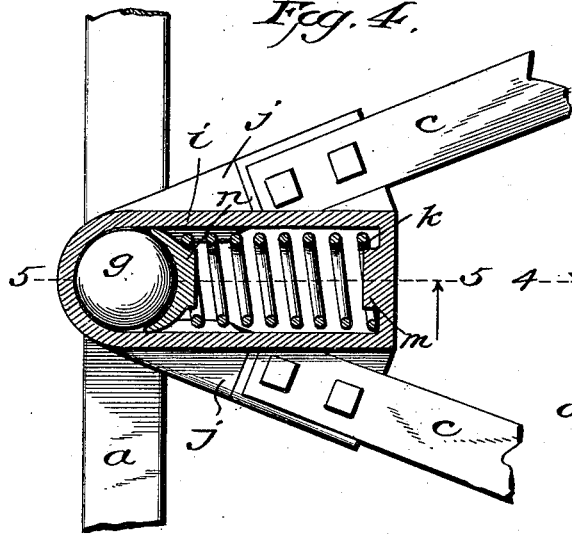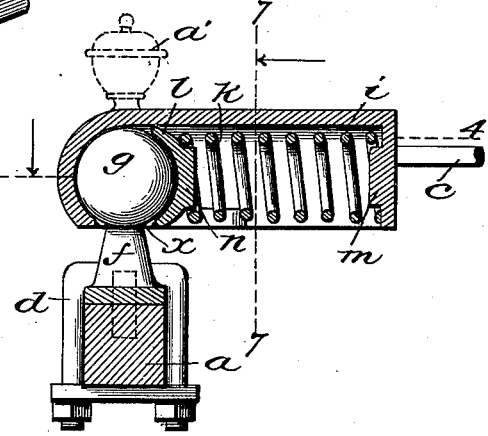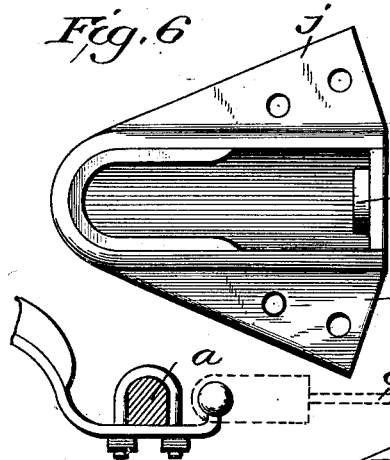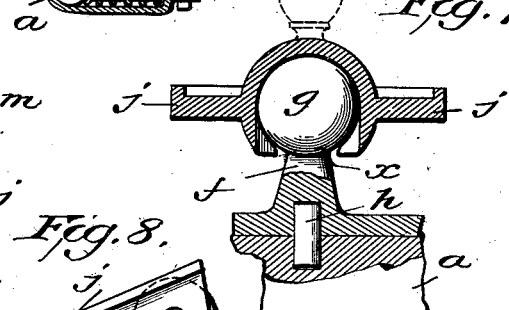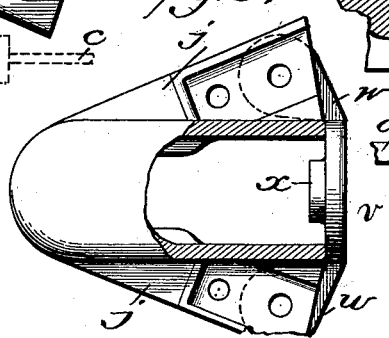

UNITED STATES PATENT OFFICE.

NATHANIEL WESTON, OF SHELBINA, MISSOURI.

SPRING-GEAR FOR BUGGIES.

SPECIFICATION forming part of Letters Patent No. 661,709, dated November 13, 1900.

Application filed September 15, 1900. Serial No. 30,168. (No model.)

*To all whom it may concern:*

Be it known that I, NATHANIEL WESTON, a citizen of the United States, residing at Shelbina, in the county of Shelby and State of Missouri, have invented certain new and useful Improvements in Spring-Gears for Buggies, of which the following is a specification, reference being had therein to the accompanying drawings, in which—

Figure 1:
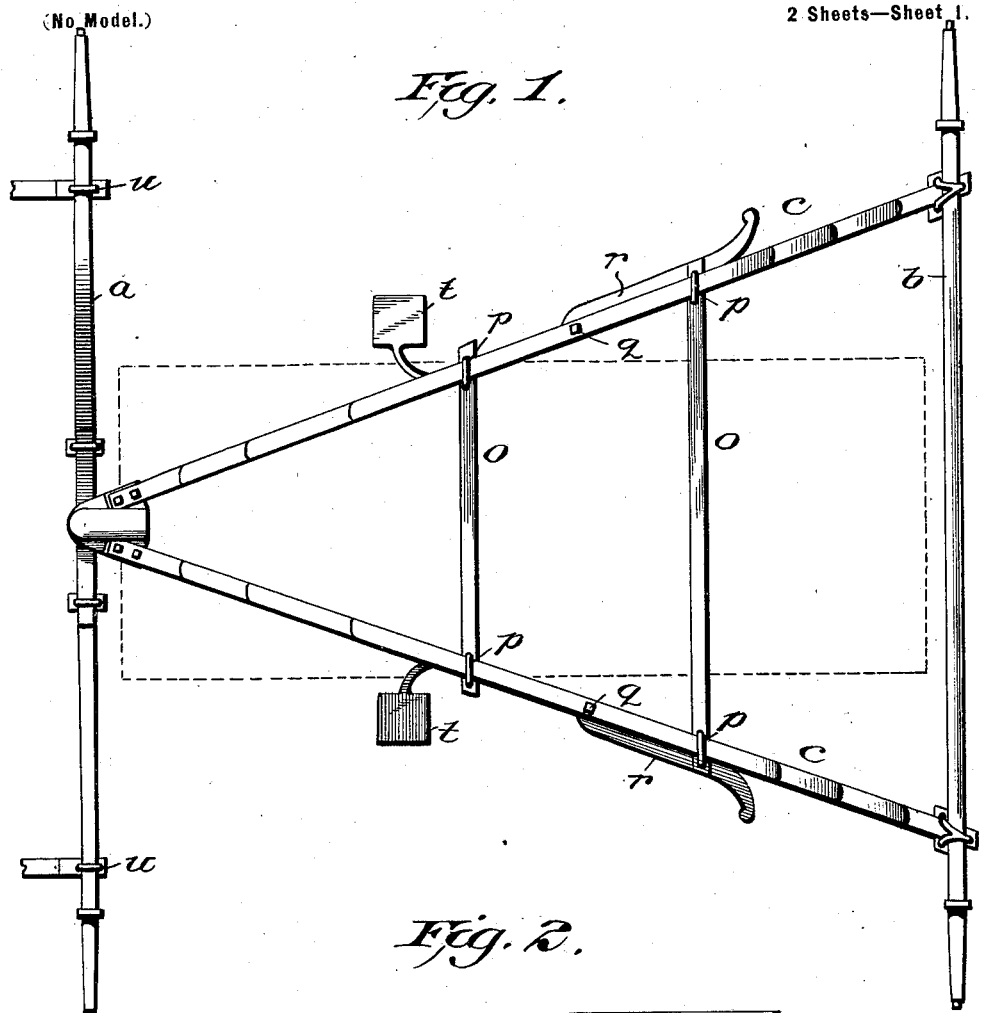
Figure 2:
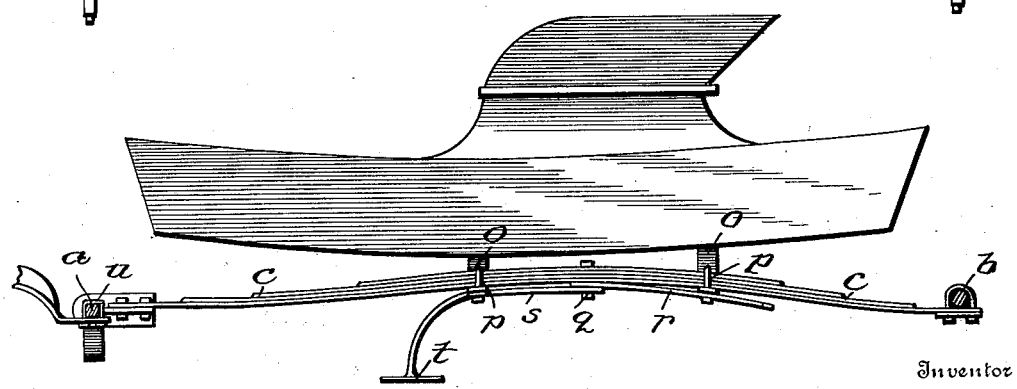

Figure 1 is a plan view of the gear, the buggy-body being shown in dotted lines and the wheels being omitted; Fig. 2, a side elevation thereof with the buggy-body in place; Fig. 3, a detail view of the front axle; Fig. 4, a horizontal section through the ball-and-socket joint connecting the forward ends of the spring to the front axle; Fig. 5, a vertical longitudinal section through the same; Fig. 6, a detail under side view of the socket member of the joint; Fig. 7, a vertical section taken on the line 7 7 of Fig. 5; and Figs. 8, 9, 10, and 11, detail views of modified forms of the universal-joint connection between the springs and the front axle.

The objects of the invention are to provide a running-gear especially for buggies which shall possess the desirable characteristics of strength, simplicity, neatness, a minimum of joints to wear, work loose, and make noise, inexpensiveness in original cost and in repairs, and durability, as more fully hereinafter set forth.

Referring to the drawings by reference-letters, $a$ designates the front axle, $b$ the rear axle, and $c$ the springs connecting the two axles, the connection to the rear axle being a rigid one and the connection to the front axle by means of the ball-and-socket devices hereinafter described.

The rear axle is of any of the usual forms; but the front axle is of the type that is bowed or bent downward at its center, and attached to the upper side of the latter by clips $d$ is a plate $e$, which is provided at its center with an upright shank $f$, which carries a ball $g$ upon its upper end, this ball being located midway between the ends of the axle and approximately in line with the spindles of the axle. To assist the clips $d$ in rigidly holding the plate $e$ in place, a dowel-pin $h$ is desirably employed between the plate and the axle, this pin resting loosely in corresponding recesses in the contacting faces of the plate and the axle. The socket member of the joint consists of a horizontal cylindrical casing $i$, having formed on its opposite sides horizontally-projecting wings or lugs $j$, to which the forward-converging ends of the spring $c$ are rigidly bolted. A longitudinal opening is formed in the under side of the casing $i$, this opening being enlarged at the rear end of the casing in order that the ball may be introduced into the casing and slid forward into the forward end of the same, the narrower or forward part of the slot or opening permitting the free passage of the shank $f$, but preventing the withdrawal of the ball. The forward end of the casing is rounded to fit the spherical form of the ball, and there is sufficient space all around the shank between the same and the edge of the opening in which the shank works to permit a limited universal movement of the two parts independently of each other. The ball is normally pressed forward into the rounded end of the casing by means of a coil-spring $k$, inclosed in the casing between its rear closed end and a slidable cap $l$, which latter is concaved to fit against the ball and to thereby form a part of the wall of the socket, a suitable enlargement $m$ being formed on the inner side of the rear wall of the casing and a similar enlargement $n$ being formed on the outer side of the cap $l$ to engage the respective end coils and hold the spring in proper position.

The buggy-body is supported directly upon a pair of transverse body-supporting bars $o$, secured rigidly to the springs by clips $p$. The leaves of each spring are secured together, as usual, by a vertical bolt $q$, passing through the spring a little to the rear of its middle. Connecting the lower end of each bolt $q$ to the rear one of the adjacent clips $p$ is a rub iron or plate $r$, and also connecting each of said bolts to the forward one of the adjacent clips $p$ is the bar $s$ of a step $t$. The inner ends of the bars $r$ and $s$ on each side of the vehicle overlap upon the under side of the spring and are clamped rigidly thereto by the bolt $q$, and their respective ends are rigidly clamped to the springs by the respective clips $p$, whereby the employment of special clips and bolts for fastening the rub-irons and step-irons to the vehicle are avoided, and the buggy-supports o are held rigidly against longitudinal movement on the springs, this latter function especially being valuable, since it cures a defect well known to exist in that class of buggies in which the buggy hangers or supports are not connected to the springs by any means other than the usual clips.

It will be observed that my improved running-gear is extremely inexpensive in construction, as well as durable, and it is also neat in appearance and very light in weight and very strong. All these features are secured by the fact that I do away entirely with the usual reach, side-bars, and side springs, and in lieu thereof employ a single pair of longitudinal springs converging at their forward ends and connected to the front axle, centrally of the same, by means of a universal-joint device. This connection also does away with the usual fifth-wheel and the king-bolt and their necessary connections. In fact, the wearing-joints in the entire gear are reduced to one—that between the socket and the ball—all the other connections being rigid. It will thus be seen that the wear will be reduced to a minimum, and what little wear does occur will be automatically taken up by the spring and the cap in the socket, and rattling noise will be entirely done away with.

It will be observed that the long springs contribute to ease of movement, and by reason of their converging arrangements the vehicle can be turned in a much smaller circle than is the case with the usual side-bar spring-gears. It will be further seen that by reason of the ball-and-socket connection the twisting strain on the buggy-body that frequently occurs with buggies employing fifth-wheel devices will be eliminated; also, that the front axle is free to rock transversely of the vehicle, and the vehicle is free to rock transversely of the front axle, so that obstructions in the road-bed may be passed over with the least amount of strain to the vehicle. It will be further seen that by reason of the ball-and-socket connection the front axle is free to rock on its spindles, so that the thill-irons u may be rigidly connected to the axle, thereby doing away with the usual pivotal thill-couplings and avoiding a source of great annoyance in all vehicles.

In the modification shown in Fig. 8 the rear end of the socket i is left open for the more convenient insertion of the spring k, and this open end is closed by a cap v, which is secured in place by means of ears w, bolted to the under side of the wings j by the same bolts that attach the springs thereto. The cap v is provided on its inner side with a circular projection x, which engages the end coil of the spring in the same manner as the projection m shown in the other views. In the modification shown in Fig. 9 the ball g is supported in the rear of the front axle by means of a suitable bent shank bolted to the under side of the axle; but this form of the device is probably not so desirable as the one in which the ball is supported centrally over the axle and in line with the spindles. In Fig. 10 the ball is shown secured or formed directly on the axle, and the socket or casing is formed by bending a strap of metal so as to embrace the ball and the adjacent rear ends of the springs c, the spring inclosed in the socket surrounding the inner ends of the springs and being inclosed in the casing in the same manner as in the other forms. In this form of device in order to provide for a sufficient universal movement of the axle the ball will have to be made considerably larger than when it is supported above or in the rear of the axle, as is obvious. In Fig. 11 the ball is supported directly over the center of the axle upon a bar clipped to the axle and passing through or attached to opposite sides of the ball, the axle being bowed coincidently with the ball. With this form of the device the strap-like form of socket shown in Fig. 10 will be employed.

The foregoing modifications are obviously within the scope of my invention, as likewise are many others not herein shown or described. For instance, it is obvious that it is within the spirit of this invention to reverse the arrangement of the members of the ball-and-socket joint and secure the ball to the springs and the socket to the axle, and I therefore do not wish to be limited in this respect.

A suitable oil-cup a' may be attached to the socket, as shown in dotted lines in Fig. 5, if desired.

It will be observed that the strain in backing the vehicle will come directly on the spring k and that said spring will thereby be compressed if the strain be sufficiently heavy to overcome the resistance of the spring. I propose, however, to employ a spring of sufficient weight to resist compression under ordinary pressure and in all cases to employ a spring coiled sufficiently closely that its coils will come together and form a rigid abutment before the cap bearing on the ball is pressed far enough back to be withdrawn from the socket. It will be obvious, further, that if what is known to the trade as a "skeleton" buggy be desired the buggy-body and its supports o may be omitted entirely and the seat suitably secured directly to the springs at the proper point and a suitable foot-bar be attached to the springs in front of the seat.

Having thus fully described my invention, what I claim, and desire to secure by Letters Patent, is—

1. In a spring-gear for vehicles, the combination of front and rear axles, the former carrying one member of a ball-and-socket joint, a pair of rearwardly-diverging springs connected to the rear axle at their rear ends and to the other member of said ball-and-socket joint at their forward ends, whereby the forward axle may not only rock upon its spindles but may also rock transversely and longitudinally independently of the springs.

2. In combination, the front axle carrying centrally one member of a ball-and-socket joint, a rear axle, a pair of springs connected to the rear axle and converging toward the center of the front axle, the other member of said ball-and-socket joint being carried by the forward ends of the springs, whereby the front axle may have a universal rocking movement independently of the remainder of the vehicle, and a spring take-up device in the joint holding the parts of the joint together and preventing noise and taking up the wear.

3. In combination with a pair of axles, the forward axle carrying midway its length a ball, which is rigidly attached to it, a pair of springs connected to the rear axle and converging toward their forward ends, a socket member rigidly connecting the forward ends of said springs and having a socket engaging said ball, whereby the front axle is permitted a universal limited movement independently of the vehicle-springs, as and for the purpose set forth.

4. In combination, a front axle carrying the ball member of a ball-and-socket joint, a rear axle, a pair of springs connected thereto and converging forwardly, a socket member of a ball-and-socket joint carried by the forward ends of the springs and engaging said ball, a spring-actuated device inclosed in said socket and normally bearing upon the ball and holding it in the forward end of the socket, for the purpose set forth.

5. In combination, a front axle, bowed or bent downward between its spindles, a ball connected to said axle and supported above the same at the center thereof approximately in line with the spindles, a rear axle, a pair of springs, a socket device connected to the forward ends of the said springs and having connection with said ball, as and for the purpose set forth.

6. In combination, a front axle carrying a ball member of a ball-and-socket joint, a rear axle, a pair of springs converging forwardly, a socket member connected to the forward ends of said springs, the under side of said socket member being slotted longitudinally, a spring inclosed in said socket, a bearing-cap actuated by said spring and bearing upon the rear side of the ball, whereby the backing strain will come upon and be taken up by the spring, for the purpose set forth.

7. In combination, a pair of supporting-axles, a pair of vehicle-springs, a pair of body-supporting bars extending transversely of the springs, devices for securing the ends of these bars to the springs, a rub-iron attached to each spring at a point between the supporting-bars and extending rearward and attached to the spring again by the same fastening device that attaches the adjacent end of the rear supporting-bar to the spring, a step-iron attached to each spring at a point between the supporting-bars and extending forward and again attached to the spring by the same device that attaches the adjacent end of the front supporting-bar to the spring, whereby the rub-irons and step-irons are utilized to hold the body-supporting bars against movement on the springs.

8. In combination, a pair of vehicle-springs, a pair of axles, a pair of supporting-bars extending transversely of the springs and rigidly secured thereto, a bolt in each spring between the supporting-bars securing the leaves of the spring together, a pair of rub-irons and a pair of step-carrying irons having their adjacent ends overlap and attached to the springs by said bolts and their other ends attached to the springs by the same devices that attach the ends of the supporting-bars to the springs, for the purpose set forth.

In testimony whereof I hereunto affix my signature, in the presence of two witnesses, this 15th day of September, 1900.

NATHANIEL WESTON.

Witnesses:
CHARLES D. DAVIS,
HERBERT C. EMERY.